(12) United States Patent
Cheng et al.

(10) Patent No.: US 9,513,838 B2
(45) Date of Patent: Dec. 6, 2016

(54) METHOD AND APPARATUS FOR PROCESSING SYSTEM COMMAND DURING MEMORY BACKUP

(71) Applicant: HUAWEI TECHNOLOGIES CO., LTD., Shenzhen (CN)

(72) Inventors: Yongbo Cheng, Chengdu (CN); Chenghong He, Shenzhen (CN); Kejia Lan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 14/132,858

(22) Filed: Dec. 18, 2013

(65) Prior Publication Data
US 2014/0164724 A1    Jun. 12, 2014

Related U.S. Application Data

(63) Continuation of application No. PCT/CN2011/076954, filed on Jul. 7, 2011.

(51) Int. Cl.
G06F 3/06 (2006.01)
G06F 11/16 (2006.01)
G06F 11/20 (2006.01)

(52) U.S. Cl.
CPC ............ *G06F 3/065* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS

2004/0122998 A1  6/2004 Chang et al.
2004/0268033 A1  12/2004 Chia et al.
(Continued)

FOREIGN PATENT DOCUMENTS

CN  101174231  5/2008
CN  101419569  4/2009
(Continued)

OTHER PUBLICATIONS

International Search Report mailed on Mar. 22, 2012 in corresponding International Application No. PCT/CN2011/076954.
(Continued)

*Primary Examiner* — Jared Rutz
*Assistant Examiner* — William E Baughman
(74) *Attorney, Agent, or Firm* — Staas & Halsey LLP

(57) ABSTRACT

A method and an apparatus for processing a system command during memory backup. The method includes: acquiring a write address corresponding to a write operation command; if data corresponding to the write address has been read from a raw memory area but is not written to a backup memory area, mapping the write operation command to the raw memory area, and writing data to the write address in the raw memory area according to the write operation command; and deducting a set value from the write address to obtain an initial address to subsequently read data from the raw memory area. According to the embodiments of the present invention, a problem of system command blocking is solved during a memory backup operation, so that a system command is processed in a timely manner.

12 Claims, 5 Drawing Sheets

(52) U.S. Cl.
CPC ........ G06F 3/0683 (2013.01); G06F 11/1666 (2013.01); *G06F 11/20* (2013.01)

(56) References Cited

U.S. PATENT DOCUMENTS

| | | | |
|---|---|---|---|
| 2006/0069865 A1* | 3/2006 | Kawamura et al. | 711/114 |
| 2009/0249116 A1* | 10/2009 | Bartfai et al. | 714/6 |
| 2011/0202719 A1* | 8/2011 | Rossi et al. | 711/114 |

FOREIGN PATENT DOCUMENTS

| | | |
|---|---|---|
| CN | 101539891 | 9/2009 |
| CN | 101739311 | 6/2010 |
| CN | 101777013 | 7/2010 |
| JP | 10-340215 | 12/1998 |
| JP | 3043662 | 5/2000 |

OTHER PUBLICATIONS

Chinese Office Action dated Nov. 5, 2012 in corresponding Chinese Patent Application No. 201180001642.8.
PCT International Search Report and Written Opinion of the International Searching Authority dated Mar. 22, 2012 in corresponding International Patent Application No. PCT/CN2011/076954.

* cited by examiner

METHOD AND APPARATUS FOR PROCESSING SYSTEM COMMAND DURING MEMORY BACKUP

CROSS-REFERENCE TO RELATED APPLICATIONS

This application is a continuation of International Application No. PCT/CN2011/076954, filed on Jul. 7, 2011, which is hereby incorporated by reference in its entirety.

TECHNICAL FIELD

Embodiments of the present invention relate to the field of computer application technologies, and in particular, to a method and an apparatus for processing a system command during memory backup.

BACKGROUND

An error-tolerant computer generally has an ECC (Error Correction Code, error correction code) error check and correction function, and memory backup is an important reliability feature of the error-tolerant computer. The memory backup means that, when the number of correctable errors in a memory area (generally in units of Rank or DIMM) exceeds a certain threshold, the memory area is considered unreliable and is most likely to be corrupted, so that data stored in the memory area is lost. Then, a memory controller reports the erroneous memory area to an operating system; the operating system searches for a proper backup memory area according to a size of the erroneous memory area, and instructs the memory controller to start a memory backup operation; and the memory controller moves data stored in the erroneous memory area to the backup memory area. In this way, a risk caused by the unreliable memory is avoided.

The memory backup operation is implemented by a backup engine module in the memory controller. A specific process is as follows:

When the number of correctable errors in a memory area exceeds a specific threshold, the memory controller starts a backup operation. The backup engine module firstly sets a read address of the backup engine to an initial address of the erroneous memory area, and initiates a read command to read data from the erroneous memory area. The backup engine module usually initiates a plurality of read commands successively to read data from the erroneous memory area successively. After receiving the data read from the erroneous memory area, the memory controller performs error correction on the data by using the ECC, and initiates a write command to write the corrected data to the backup memory space. If data in the erroneous memory area is not moved completely, a read address is added to continue to read subsequent data, and the foregoing operations are repeated until the memory backup operation is complete.

In the memory backup operation, the operating system may initiate a read and write operation command on the erroneous memory area. If a sequence number of the address in the command is smaller than a maximum sequence number of the address of data that has been read by the backup engine module and is greater than a maximum sequence number of the address of data that has been written by the backup engine module, the read and write operation command is blocked directly.

During the implementation of the present invention, the inventor discovers that the prior art has at least the following problem: in the current technical solution, a conflicting system command is blocked directly, which affects performance of read and write operations of the system.

SUMMARY

Embodiments of the present invention provide a method and an apparatus for processing a system command during memory backup, so that the system command is unblocked during the memory backup operation and the system command is processed in a timely manner.

A method for processing a system command during memory backup includes:

acquiring a write address corresponding to a write operation command;

if data corresponding to the write address has been read from a raw memory area but is not written to a backup memory area, mapping the write operation command to the raw memory area, and writing data to the write address in the raw memory area according to the write operation command; and deducting a set value from the write address to obtain an initial address to subsequently read data from the raw memory area.

A system command controller during memory backup includes:

an address comparing module, configured to acquire a write address corresponding to a write operation command, and determine that data corresponding to the write address has been read from a raw memory area but is not written to a backup memory area; and a data processing module, configured to map the write operation command to the raw memory area, and write data to the write address in the raw memory area according to the write operation command.

According to the technical solutions, in the embodiments of the present invention, a write operation command is mapped to a raw memory area, and data is written to a write address in the raw memory area according to the write operation command. In this way, a problem of system command blocking during a memory backup operation is solved and the write operation command is processed in a timely manner. In addition, data consistency is ensured in the case of a conflict between the write operation command and a memory backup address, thereby increasing system performance during the memory backup operation.

DESCRIPTION OF EMBODIMENTS

Embodiment 1

Figure 1:
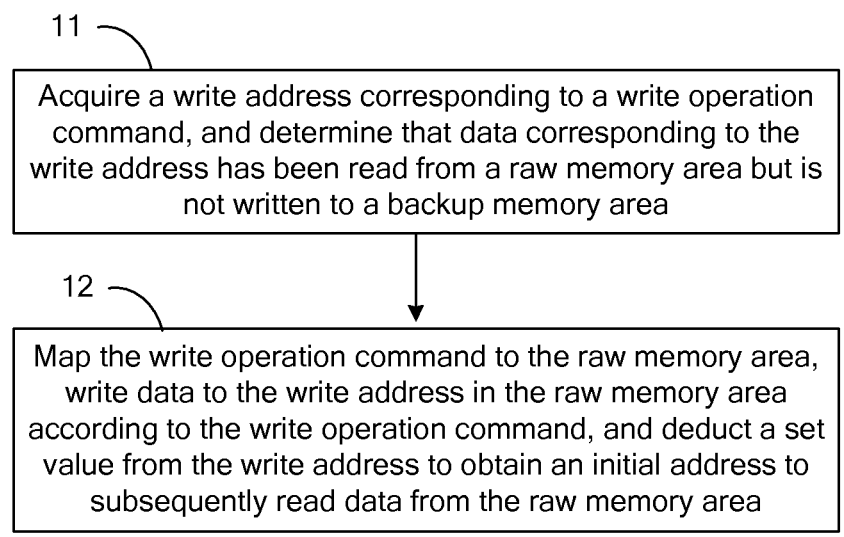
FIG. 1 is a flowchart of a method for processing a system command during memory backup according to Embodiment 1 of the present invention.

As shown in FIG. 1, a process of a method for processing a system command during memory backup provided in this embodiment includes the following processing steps:

Step 11: Acquire a write address corresponding to a write operation command, and determine that data corresponding to the write address has been read from a raw memory area but is not written to a backup memory area.

During memory backup, a backup engine module sequentially reads, according to a backup read command initiated by the backup engine module, data from the raw memory area in ascending order of sequence number of the data addresses; and, after performing error correction on the read data, the backup engine module caches the data. Then, the backup engine module sequentially writes, according to a backup write command initiated by the backup engine module, the read data to the backup memory area in ascending order of sequence number of the data addresses. A maximum address of the data that has been read by the backup engine module from the raw memory area and a maximum address of the data that has been written by the backup engine module to the backup memory area are acquired.

Because a certain delay exists between the backup read command the backup write command that are initiated by the backup engine module, the maximum sequence number of the address of the data that has been read from the raw memory area is usually greater than the maximum sequence number of the address of the data that has been written to the backup memory area.

The write address of the write operation command is acquired from an operating system. If the sequence number of the write address is smaller than or equal to the maximum sequence number of the address of the data read from the raw memory area and is greater than the maximum sequence number of the address of the data written to the backup memory area, it is determined that the data corresponding to the write address has been read by the backup engine module from the raw memory area but is not written to the backup memory area, that is, the data corresponding to the write address is being cached.

Step 12: Map the write operation command to the raw memory area, and write data to the write address in the raw memory area according to the write operation command.

Then, a set value (for example, 1) is deducted from the write address to obtain an initial address to subsequently read data from the raw memory area, and the backup engine module reads, starting from the initial address, data from the raw memory area subsequently.

According to the technical solution provided in this embodiment of the present invention, in this embodiment of the present invention, a problem of system command blocking is solved during a memory backup operation, so that a write operation command is processed in a timely manner. In addition, data consistency is ensured in the case of a conflict between the write operation command and a memory backup address, thereby increasing system performance during the memory backup operation.

Embodiment 2

Figure 2:
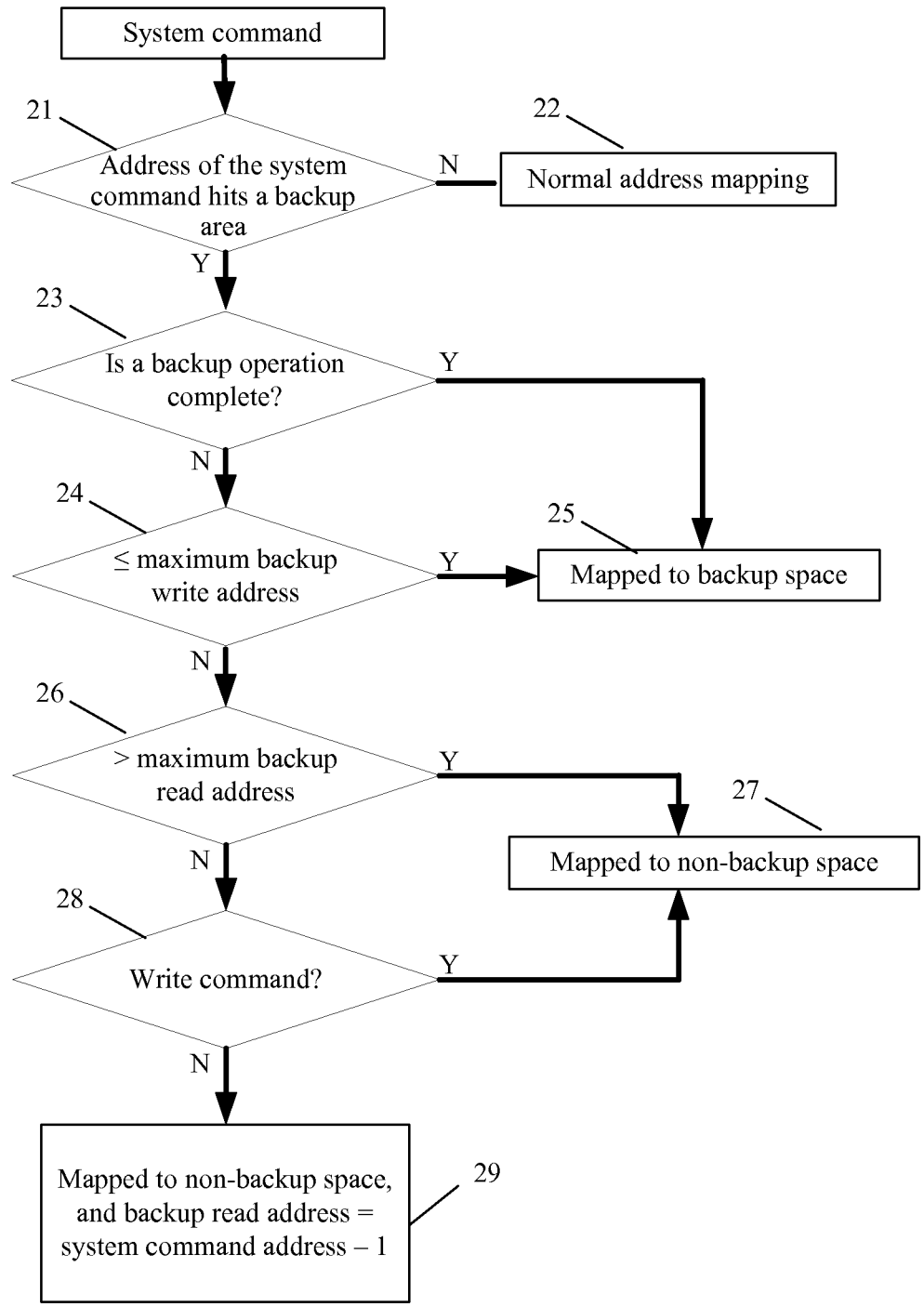
FIG. 2 is a flowchart of a method for processing a system command during memory backup according to Embodiment 2 of the present invention.

As shown in FIG. 2, a process of a method for processing a system command during memory backup provided in this embodiment includes the following processing steps:

Step 21: In an error-tolerant computer, various system commands are maintained in a command queue. When the command queue is idle, a backup engine module initiates backup read commands successively to read data from a raw memory area, and after performing error correction on the read data, the backup engine module caches the data. Then, the backup engine module initiates a backup write command to write the cached data to a backup memory area.

Figure 3:
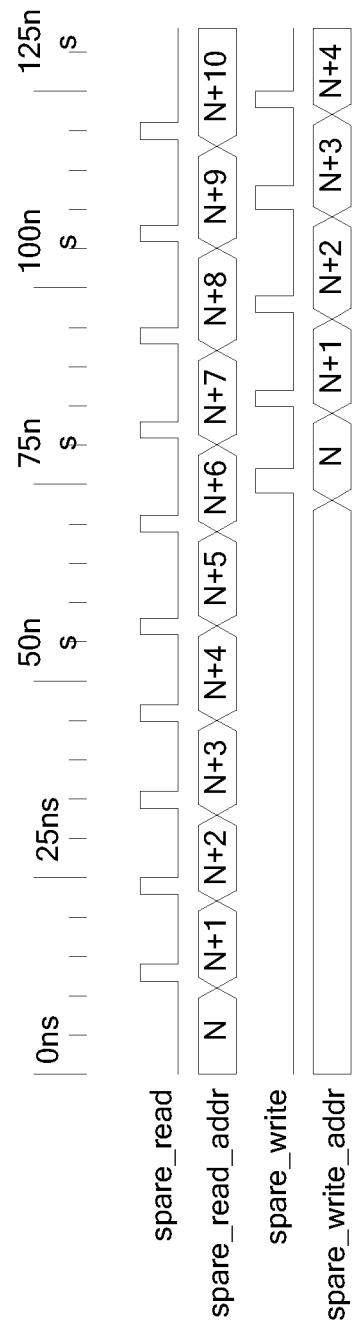
FIG. 3 is a schematic diagram illustrating data reading and writing operations performed by a backup engine module in ascending order of sequence number of the data addresses according to Embodiment 2 of the present invention.

FIG. 3 is a schematic diagram illustrating data reading and writing operations performed by a backup engine module in ascending order of sequence number of the data addresses according to this embodiment. In FIG. 3, a maximum address of data that has been read by the backup engine module from the raw memory area is N+6, and a maximum address of data that has been written to the backup memory area is N, where data corresponding to address N+1 to address N+6 is in cached state.

An address of a system command is acquired and whether the address of the system command belongs to the raw memory area is determined. If yes, step 23 is executed; otherwise, step 22 is executed.

Step 22: If the address of the system command does not belong to the raw memory area, there is no conflict between the system command and the memory backup operation performed by the backup engine module, and normal mapping and processing operations are performed on the system command.

Step 23: When the address of the system command belongs to the raw memory area, determine whether the memory backup operation performed by the backup engine module is already complete; if yes, step 24 is executed; otherwise, step 25 is executed.

Step 24: Determine that data corresponding to the address of the system command has been written to a backup memory area, and then map the system command to the backup memory area, and perform a corresponding data processing operation in the backup memory area according to the system command.

Step 25: Determine whether the address of the command is smaller than or equal to the maximum address of the data that has been written by the backup engine module to the backup memory area. For example, determine, according to FIG. 3, whether the address of the command is smaller than or equal to N. If yes, step 24 is executed; otherwise, step 26 is executed.

Step 26: Determine that the address of the system command is not written to the backup address area, and then determine whether the address of the command is greater than the maximum address of the data that has been read by the backup engine module from the raw memory area. For example, determine, according to FIG. 3, whether the address of the command is greater than N+6. If yes, step 27 is executed; otherwise, step 28 is executed.

Step 27: Map the system command to the raw memory area, and perform a corresponding data processing operation in the raw memory area according to the system command.

Step 28: Determine that the data corresponding to the address of the system command has been read by the backup engine module from the raw memory area but is not written to the backup memory area; determine whether the system command is a write command, and if yes, step 27 is executed; otherwise, step 29 is executed.

Step 29: Map the system command to the raw memory area, and write data to the raw memory area according to the address of the system command.

A set value (for example, 1) is deducted from the address of the system command to obtain an initial address for the backup engine module to read data from the raw memory area next time. The backup engine module reads, starting from the initial address, data from the raw memory area subsequently.

According to the technical solution provided in this embodiment of the present invention, in this embodiment of the present invention, a problem of system command blocking is solved during a memory backup operation, so that a system command is processed in a timely manner. In addition, data consistency is ensured in the case of a conflict between the system command and a memory backup address, thereby increasing system performance during the memory backup operation.

By using the technical solution provided in this embodiment of the present invention, when there are only a few system commands, a backup engine module initiates backup read and write operations successively to speed up a backup operation; and when there are many system commands, because the memory backup operation does not block the system commands, it is ensured that the system commands are executed in priority.

Embodiment 3

Figure 4:
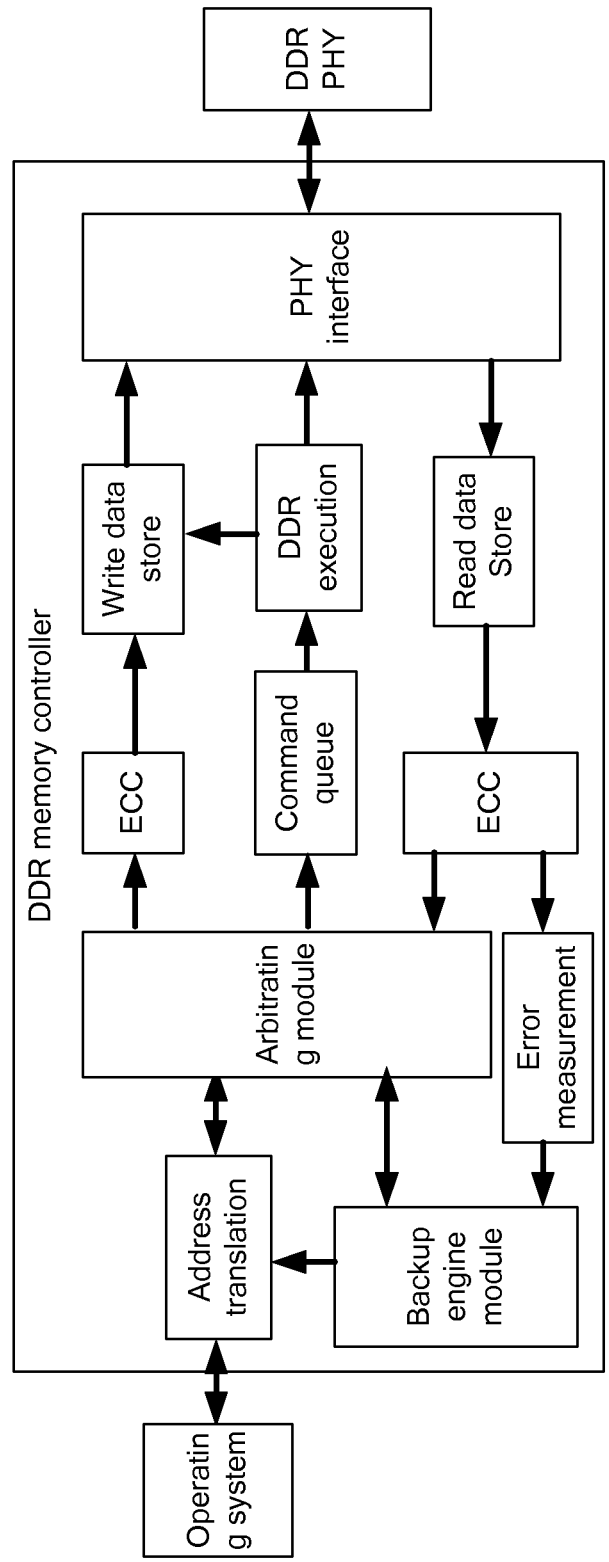
FIG. 4 is a schematic diagram illustrating a position of a backup engine module in a DDR (Dual data rate, dual data rate) memory controller according to Embodiment 2 of the present invention.

In an error-tolerant computer, a memory backup operation is completed by a backup engine module in a memory controller. FIG. 4 is a schematic diagram illustrating a position of a backup engine module in a DDR (Dual data rate, dual data rate) memory controller according to this embodiment. The backup engine module is responsible for starting and executing backup operation related commands such as Pre-charge (pre-charge), Active (active), and Write (write)/Read (read). After performing arbitration on a command, an arbitrating module sends the command to a command queue, where the command queue stores all commands to read and write the DDR, namely, system commands, backup read commands, and backup write commands. The command queue may store a lot of commands, usually more than 8, and performance of multiple commands in the command queue can be optimized according to a time sequence feature of DDR read and write operations. A DDR executing module receives and executes a command output by the command queue. An ECC module is responsible for performing redundancy bit calculation on written data and error check on read data. An error measuring module measures the number of errors in each memory area according to results of the redundancy bit calculation on the written data and the error check on the read data that are performed by the ECC module, and sends the number of errors to the backup engine module. The backup engine module compares the number of errors in each memory area with a threshold of backup operations to determine whether a backup operation needs to be started.

Figure 5:
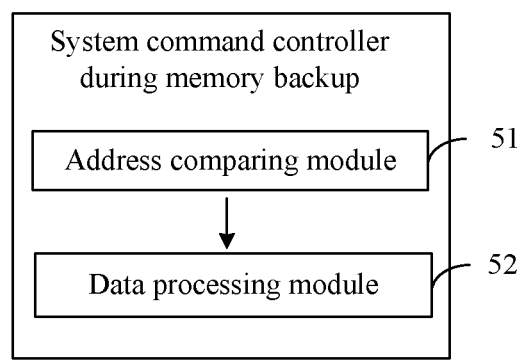
FIG. 5 is a diagram of a specific structure of an apparatus for processing a system command during memory backup according to Embodiment 3 of the present invention.

This embodiment further provides a system command controller during memory backup. The apparatus is arranged in the backup engine module. A specific structure of the apparatus is shown in FIG. 5, and includes the following modules:

an address comparing module 51, configured to acquire a write address corresponding to a write operation command, and determine that data corresponding to the write address has been read from a raw memory area but is not written to a backup memory area; and a data processing module 52, configured to map the write operation command to the raw memory area, and write data to the write address in the raw memory area according to the write operation command.

Specifically, the address comparing module 51 is further configured to, when the backup engine module sequentially reads, according to a received read command, data from the raw memory area in ascending order of sequence number of the data addresses and sequentially writes, according to a received write command, the read data to the backup memory area in ascending order of sequence number of the data addresses, acquire a maximum address of the data that has been read by the backup engine module from the raw memory data and a maximum address of the data that has been written by the backup engine module to the backup memory area; and if the address of the command is smaller than or equal to the maximum address of the data read from the raw memory area and is greater than the maximum address of the data written to the backup memory area, determine that the data corresponding to the address of the system command has been read by the backup engine module from the raw memory area but is not written to the backup memory area.

Specifically, the data processing module 52 is further configured to, if the write address is greater than the maximum address of the data read from the raw memory area, map the write operation command to the raw memory area, and write data to the write address in the raw memory area according to the write operation command.

Specifically, the data processing module 52 is further configured to, if the write address is smaller than or equal to the maximum address of the data written to the backup memory area, map the write operation command to the backup memory area, and write data to the write address in the backup memory area according to the write operation command.

Specifically, the data processing module 52 is further configured to acquire a read address corresponding to a read operation command, map the read operation command to the raw memory area, and read data from the read address in the raw memory area according to the read operation command.

A specific process of performing memory backup by using the apparatus in this embodiment of the present invention is similar to the foregoing method embodiment, which is not further described herein.

A person skilled in the art can understand that all or some of the processes in the foregoing method embodiments may be implemented by related hardware instructed by a computer program. The program may be stored in a computer readable storage medium. When the program is executed, the processes of the foregoing embodiments of the methods are involved. The storage medium may be a magnetic disk, a compact disk, a read-only memory (Read-Only Memory, ROM) or a random access memory (Random Access Memory, RAM), or the like.

In conclusion, in the embodiments of the present invention, a problem of system command blocking is solved during a memory backup operation, so that a system command is processed in a timely manner. In addition, data consistency is ensured in the case of a conflict between the system command and a memory backup address, thereby increasing system performance during the memory backup operation.

By using the technical solutions provided in the embodiments of the present invention, when there are only a few system commands, a backup engine module initiates backup read and write operations successively to speed up a backup operation; and when there are many system commands, because the memory backup operation does not block the system commands, it is ensured that the system commands are executed in priority.

The foregoing descriptions are merely exemplary specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing a system command during a memory backup process, wherein through the memory backup process, data is sequentially read from a raw memory area in ascending order of addresses of the data and the read data is sequentially written to a backup memory area in ascending order of the addresses of the data, and the method comprises:

acquiring a write address corresponding to a write operation command from an operating system;

acquiring a maximum address of data that has been read from the raw memory area through the memory backup process and a maximum address of data that has been written to a backup memory area through the memory backup process; and when the write address is smaller than or equal to the maximum address of the data that has been read from the raw memory area and is greater than the maximum address of the data that has been written to the backup memory area writing data to the write address in the raw memory area according to the write operation command, and deducting a set value from the write address to obtain an initial address for the memory backup process to subsequently read data from the raw memory area.

2. The method according to claim 1, further comprising:
when the write address is greater than the maximum address of the data that has been read from the raw memory area, then writing data to the write address in the raw memory area according to the write operation command.

3. The method according to claim 1, further comprising:
when the write address is smaller than or equal to the maximum address of the data that has been written to the backup memory area, then writing data to the write address in the backup memory area according to the write operation command.

4. The method according to claim 1, further comprising:
acquiring a read address corresponding to a read operation command, and reading data from the read address in the raw memory area according to the read operation command.

5. A non-transitory computer readable medium storing codes for processing a system command during a memory backup process, wherein through the memory backup process, data is sequentially read from a raw memory area in ascending order of addresses of the data and the read data is sequentially written to a backup memory area in ascending order of the addresses of the data, and the codes when executed by a processor of a computer perform:

acquiring a write address corresponding to a write operation command from an operating system;

acquiring a maximum address of data that has been read from the raw memory area through the memory backup process and a maximum address of data that has been written to a backup memory area through the memory backup process; and when the write address is smaller than or equal to the maximum address of the data that has been read from the raw memory area and is greater than the maximum address of the data that has been written to the backup memory area, writing data to the write address in the raw memory area according to the write operation command, and deducting a set value from the write address to obtain an initial address for the memory backup process to subsequently read data from the raw memory area.

6. The non-transitory computer readable medium according to claim 5, wherein the codes when executed by a processor of a computer further performs:
when the write address is greater than the maximum address of the data that has been read from the raw memory area, then writing data to the write address in the raw memory area according to the write operation command.

7. The non-transitory computer readable medium according to claim 5, wherein the codes when executed by a processor of a computer further performs:
when the write address is smaller than or equal to the maximum address of the data that has been written to the backup memory area, then writing data to the write address in the backup memory area according to the write operation command.

8. The non-transitory computer readable medium according to claim 5, wherein the codes when executed by a processor of a computer further performs:
acquiring a read address corresponding to a read operation command, and reading data from the read address in the raw memory area according to the read operation command.

9. A computer, comprising:
a memory;
a memory controller; and
a processor, wherein:
the memory is configured to store data, and the memory comprises a raw memory area and a backup memory area;
the processor is configured to run an operating system, wherein a write operation command is sent by the operating system to the memory controller for writing data to the memory;
the memory controller is configured to:
run a memory backup process, wherein through the memory backup process, data is sequentially read from the raw memory area in ascending order of addresses of the data and the read data is sequentially written to the backup memory area in ascending order of the addresses of the data;
acquire a write address corresponding to a write operation command from the operating system;
acquire a maximum address of data that has been read from the raw memory area through the memory backup process and a maximum address of data that has been written to the backup memory area through the memory backup process; and
when the write address is smaller than or equal to the maximum address of the data that has been read from the raw memory area and is greater than the maximum address of the data that has been written to the backup memory area, write data to the write address in the raw memory area according to the write operation command, and deduct a set value from the write address to obtain an initial address for the memory backup process to subsequently read data from the raw memory area.

10. The computer according to claim 9, wherein the memory controller is further configured to:
- when the write address is greater than the maximum address of the data read from the raw memory area, then write data to the write address in the raw memory area according to the write operation command.

11. The computer according to claim 9, wherein the memory controller is further configured to:
- when the write address is smaller than or equal to the maximum address of the data written to the backup memory area, then write data to the write address in the backup memory area according to the write operation command.

12. The computer according to claim 9, wherein the memory controller is further configured to:
- acquire a read address corresponding to a read operation command, and read data from the read address in the raw memory area according to the read operation command.

* * * * *